United States Patent
Hurd et al.

[15] 3,647,266
[45] Mar. 7, 1972

[54] VELOCITY CONTROL SYSTEM FOR AIR CONVEYORS

[72] Inventors: Stanley E. Hurd, Sunnyvale; Leong Q. Fong, San Jose, both of Calif.

[73] Assignee: Bangor Punta Operations, Inc., Greenwich, Conn.

[22] Filed: Jan. 8, 1971

[21] Appl. No.: 104,869

[52] U.S. Cl. ........................................................302/31
[51] Int. Cl. .....................................................B65g 54/04
[58] Field of Search ..................302/31; 271/74 FC; 221/278

[56] References Cited

UNITED STATES PATENTS

| | | | |
|---|---|---|---|
| 1,979,138 | 10/1934 | Bingman | 302/31 |
| 3,395,943 | 8/1968 | Wilde et al. | 302/31 |

*Primary Examiner*—Evon C. Blunk
*Assistant Examiner*—Hadd S. Lane
*Attorney*—Patrick J. Walsh

[57] ABSTRACT

The system includes a deck having multiple openings for communicating air from an underlying plenum to lift and advance an object along a predetermined path spaced above and adjacent the deck. To retard fast moving objects without affecting slower moving objects, a barrier is disposed in the path of movement of the objects. Enlarged openings are provided through the deck directly upstream of the barrier to provide a lifting airjet of increased capacity. The fast moving objects have sufficient forward momentum to penetrate the larger capacity lifting airjet and strike the barrier. The larger capacity airjet lifts the stopped object over the barrier whereupon the object again starts moving downstream. The slower moving objects are lifted by the larger capacity airjet to an elevation above the barrier prior to hitting the barrier and are thus conveyed over the barrier without significant loss of velocity.

14 Claims, 11 Drawing Figures

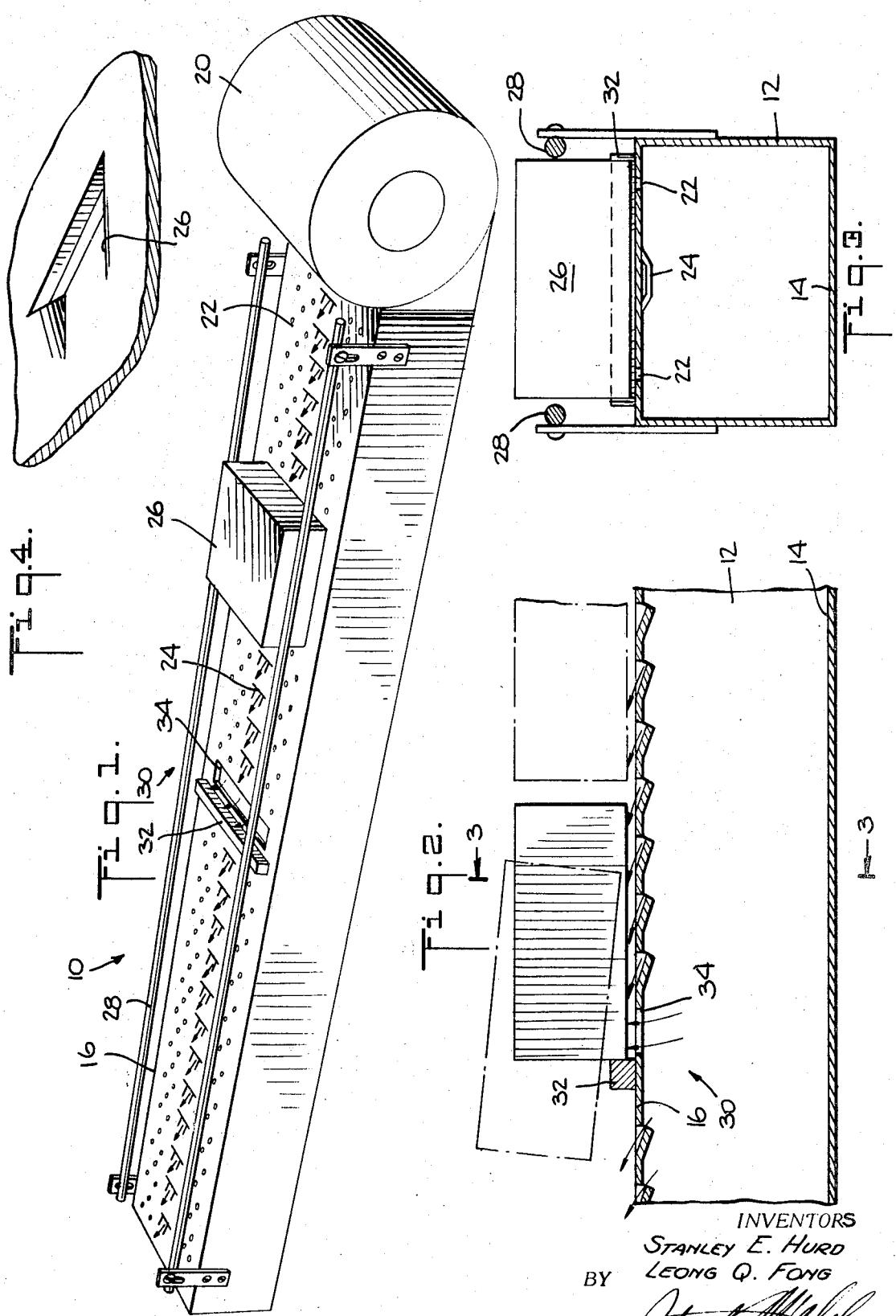

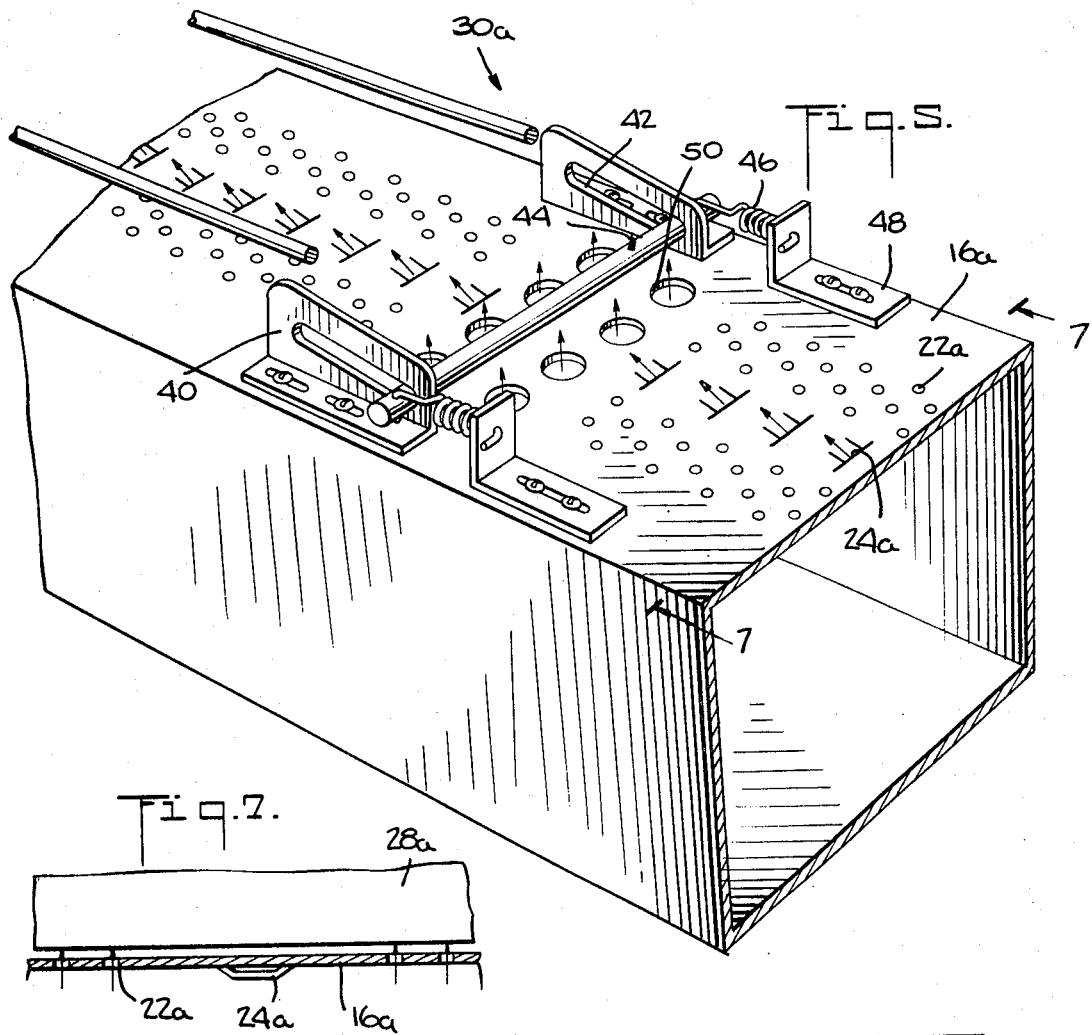
Fig. 5.
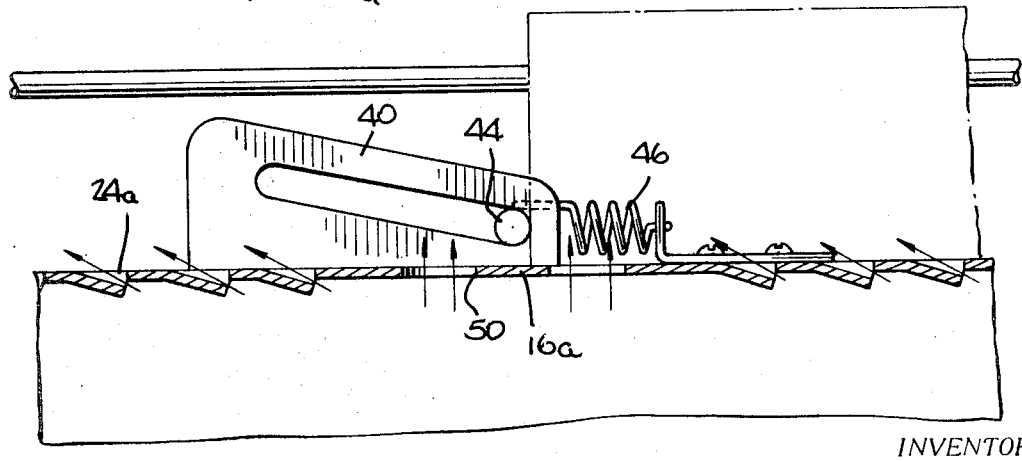
Fig. 7.
Fig. 6.

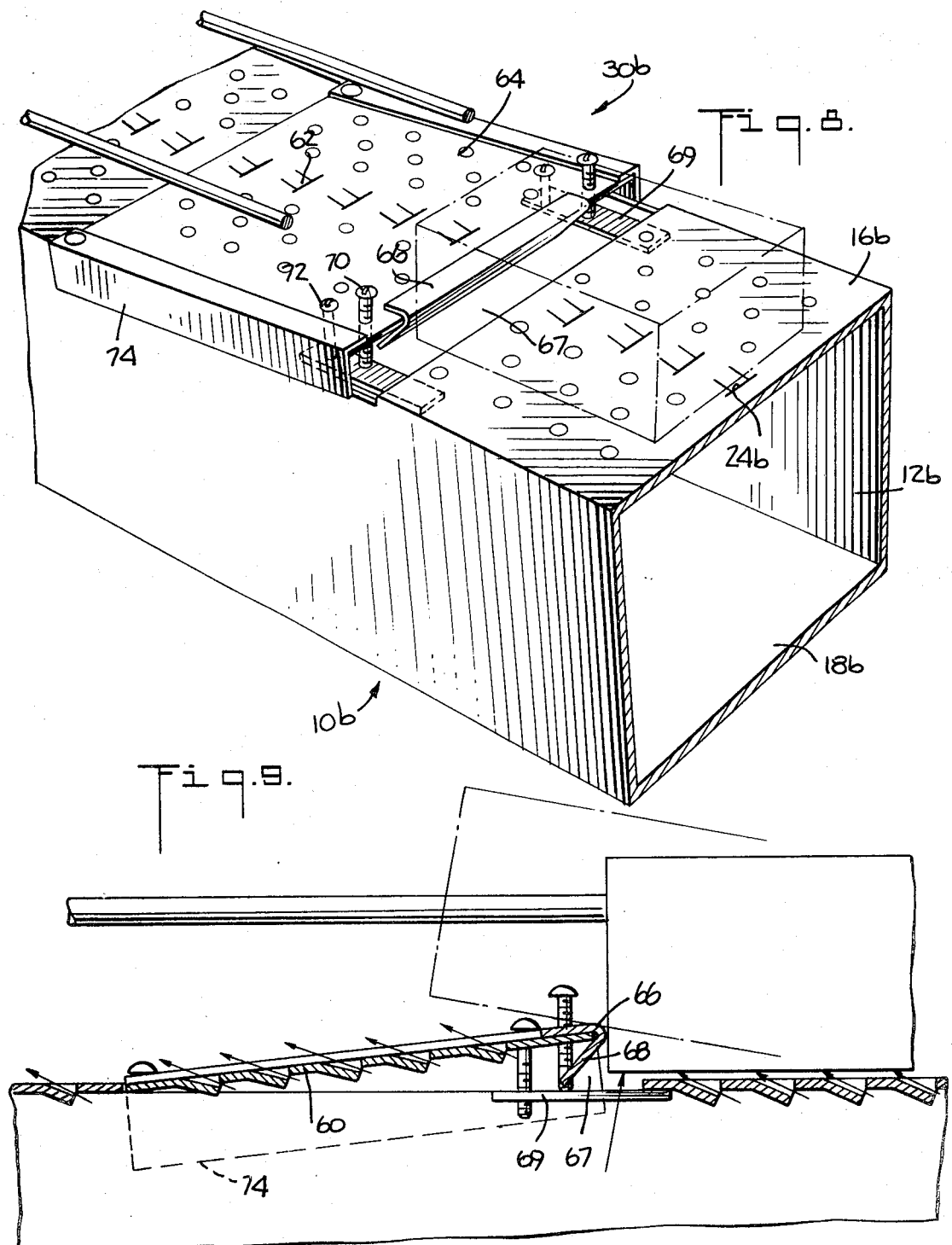

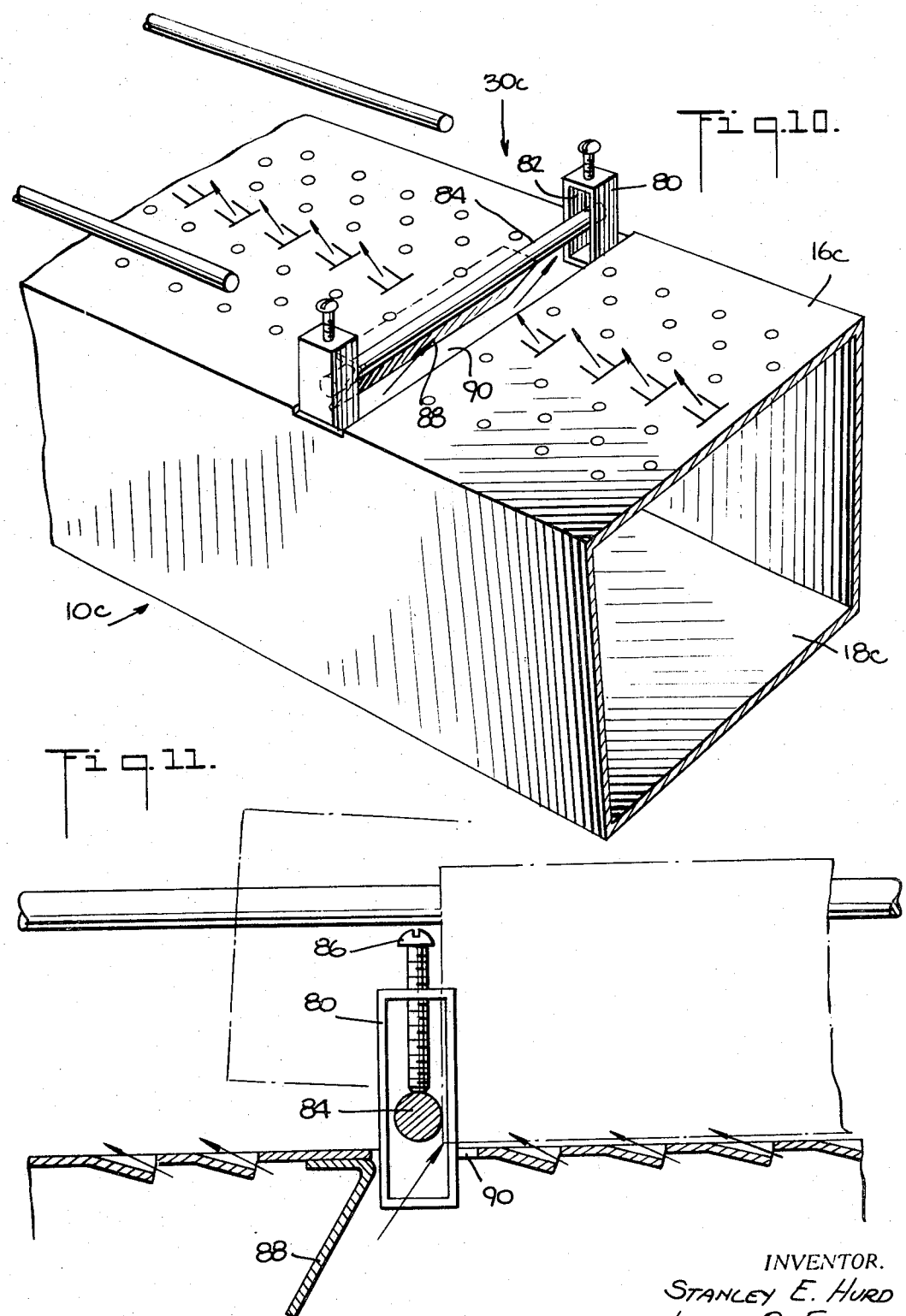

VELOCITY CONTROL SYSTEM FOR AIR CONVEYORS

The present invention relates to a velocity control system for air conveyed objects and particularly relates to a velocity control system which discriminates between fast and slow moving objects and retards or stops the faster moving objects without significantly retarding or stopping the slower moving objects.

Air conveyors for moving objects along a predetermined path without physical contact between the objects and the conveyor are known in the prior art. One of the difficulties in air conveying systems is that the objects, when in motion, continue to accelerate and obtain such excess velocity as to preclude control over the objects. Moreover, the excess velocity subjects the objects to damaging impact whenever they are stopped at the end of or on the conveyor. It is therefore desirable to reduce the speed of the faster moving air conveyed objects to or below a predetermined velocity.

It will be appreciated that, in air conveyor systems, there are a large number of variables including the weight and dimensional characteristics of the objects being conveyed which determine the required and/or desirable lifting and propelling forces which, in turn, determine the speed at which the objects are conveyed. Consequently, specified objects conveyed along an air conveyor obtain various velocities. While it may therefore be desirable to retard or periodically stop objects being conveyed at velocities in excess of a predetermined velocity in order to retain control over objects, it is also desirable that the velocity control device not significantly affect the velocity of objects being moved along the air conveyor at slower velocity, i.e., at or below the predetermined velocity, in order that accumulation recovery rates for the conveyor are not significantly affected. Thus, a significant consideration in the design of an effective velocity control system for an air conveyor is the desirability to discriminate between fast and slow moving objects whereby accumulation recovery rates are not adversely affected.

The present invention uniquely fulfills the foregoing described requirements for an air conveyor and provides a velocity control device at one or more predetermined locations along the conveyor. The velocity control device includes a barrier or stop in the path of movement of objects conveyed which, in conjunction with the disposition of one or more enlarged openings in the conveyor deck immediately upstream of the location of the stop, operates to retard or stop fast moving objects without significantly affecting the rate of movement of slower moving objects. In one embodiment of the present invention, a stop bar is disposed on the conveyor deck in the path of movement of the objects. The desk is disposed over a plenum and has lifting holes and directional slots through which lifting and directional airjets issue and which jets cooperate to convey objects downstream along a cushion of air. An enlarged opening is provided in the deck immediately adjacent the stop bar on the upstream side thereof whereby a lifting jet of enlarged capacity is provided. In operation, a fast moving object being conveyed along the conveyor deck has sufficient forward momentum to fully penetrate the larger lifting airjet issuing through the enlarged opening before the jet is effective to elevate the object over the bar. The fast moving object thus strikes the bar and its forward motion is momentarily stopped. This larger lifting jet then becomes effective to lift the object to a height such that it clears the bar. The object then starts to move forwardly and begins to accelerate in the downstream direction. The velocity of the fast moving object is thus slowed considerably in the area immediately beyond the stop and control over the object is thus retained. When a slower moving object reaches the area of the stop bar, its forward momentum is insufficient to carry it completely through or to fully penetrate the larger airjet prior to the latter air jet becoming fully effective to lift the object over the stop bar. Accordingly, the slower moving object does not strike the stop bar and its rate of movement along the conveyor is thus not significantly affected as it passes over the barrier and enlarged capacity lifting jet. The velocity control device hereof thus discriminates between fast and slow moving objects, slowing down the fast moving objects while not significantly affecting the rate of movement of the slower moving objects.

In another form hereof, a barrier in the form of a rod is disposed across the conveyor deck in the path of movement of the objects, opposite ends of the rod being carried in inclined slots. The rod is spring biased and provides a resilient stop against which the fast moving objects engage. Enlarged openings are provided in the deck on opposite sides of the rod and the larger airjets issuing therefrom lift the objects over the rod for further forward movement along the conveyor. In a still further form hereof, a stop plate is pivotally mounted on the conveyor deck. When the plate is pivoted upwardly, its upstream edge forms a stop against which the objects may engage. The forward edge of the plate and the downstream edge of the deck adjacent the forward edge of the plate provide an enlarged opening. The under surface of the plate adjacent its upstream edge is inclined to direct an airjet issuing through the enlarged opening upwardly and in a slightly upstream direction. The enlarged airjet is directed diagonally through the slot to provide optimum lift to the object and thereby lift it over the plate. In a still further form hereof, a bar is disposed across the conveyor deck in the path of movement of the object. Opposite ends of the bar are located in guides along the opposite sides of the conveyor deck and the rod is freely mounted in the guides for vertical movement. An enlarged lift hole is disposed below the rod and the lifting jet issuing therethrough maintains the rod in an uppermost floating position bearing against the lower ends of screws threaded into the guides. The height of the rod above the conveyor deck can be adjusted by threading the screws. Again, fast moving objects are stopped by the rod and then lifted over the rod by the large airjet. The slower moving objects pass over the rod without significant affect on their rate of movement along the conveyor.

Accordingly, it is a primary object of the present invention to provide a novel and improved velocity control system for air conveyed objects.

It is another object of the present invention to provide a velocity control system for air conveyed objects which discriminates between fast and slow-moving objects whereby fast-moving objects are slowed while the velocity of slower moving objects is not substantially affected.

It is still another object of the present invention to provide a velocity control system for air conveyed objects which does not require moving parts, control sensors or other mechanisms of a similar type.

It is a further object of the present invention to provide a velocity control system for air conveyed objects which does not substantially affect the accumulation recovery rates of the conveyor.

It is still a further object of the present invention to provide a velocity control system for air conveyed objects which is simple and inexpensive to construct and does not require protrusions or other mechanisms above the conveyor area.

These and further objects and advantages of the present invention will become more apparent upon reference to the following specification, appended claims and drawings wherein;

FIG. 1 is a perspective view of an air conveyor incorporating a velocity control system constructed in accordance with the present invention;

FIG. 2 is a fragmentary vertical cross-sectional view thereof illustrating the manner in which a fast moving object is slowed;

FIG. 3 is a cross-sectional view taken generally about on lines 3—3 in FIG. 2;

FIG. 4 is a fragmentary perspective view of a directional slot employed in the air conveyor illustrated in FIG. 1;

FIG. 5 is a fragmentary perspective view of an air conveyor employing another form of velocity control system therefor;

FIG. 6 is an enlarged fragmentary cross-sectional view of the stopping device employed in the velocity control system illustrated in FIG. 5;

FIG. 7 is a fragmentary cross-sectional view taken generally about on lines 7—7 in FIG. 5;

FIG. 8 is a fragmentary perspective view of an air conveyor employing still another form of velocity control system therefor;

FIG. 9 is a fragmentary vertical cross-sectional view of the stop mechanism employed with the velocity control system illustrated in FIG. 8;

FIG. 10 is a fragmentary perspective view of an air conveyor employing a still further form of velocity control system therefor; and FIG. 11 is an enlarged cross-sectional view of the stopping mechanism employed with the velocity control system illustrated in FIG. 10.

Referring now to the drawings, particularly to FIGS. 1–4, there is illustrated an air conveyor, generally indicated 10, having elongated side and bottom walls 12 and 14 respectively, and an elongated conveyor deck 16, the walls and deck enclosing an elongated plenum 18. An air blower 20 is provided at one end of conveyor 10 for supplying air to plenum 18. The air in plenum 18 is adapted to communicate upwardly through a plurality of openings in conveyor deck 16. Particularly, the openings comprise lift holes 22 and directional slots 24. The lift holes 22 are configured to issue air from plenum 18 in the form of a substantially vertically directed jet for the purpose of lifting an object, for example the box 26 illustrated in FIG. 1, above deck 16. Slots 24 are configured to issue air from plenum 18 in the form of a jet having a predominantly horizontal flow component above deck 16 for the purpose of propelling an object along conveyor 10. The lift holes and directional slots may be arranged in conveyor deck 16 in any suitable manner, for example as illustrated in U.S. Pat. No. 3,180,688 or in copending application, Ser. No. 106,056 filed Jan. 13, 1971, of common assignee herewith. It is sufficient for present purposes to note that the lift holes 22 and directional slots 24 respectively function to maintain the objects in spaced relation above conveyor deck 16 and to propel them along conveyor 10 in the desired direction respectively. A pair of guide rails 28 are also provided along opposite sides of deck 16.

As noted hereinbefore, the air issuing through directional slots 24 tends to continue to accelerate objects 26 along conveyor 10. That is to say, when an object 26 is set in motion, its velocity increases and this results in decreasing capability to control the object. Consequently, after object 26 has moved a predetermined distance along conveyor 10, it is desirable to stop or retard the object.

In order to accomplish this, and before object 26 obtains a velocity beyond which control over the object becomes virtually impossible, there is provided along conveyor 10 a velocity control station generally indicated at 30. Control station 30 includes, in the form hereof illustrated in FIGS. 1–4, an elongated bar 32 disposed across conveyor deck 16 in the path of movement of the objects being conveyed along conveyor 10. That is to say, bar 32 projects upwardly above the surface of deck 16 sufficiently to intercept an object conveyed along conveyor 10 and provides a barrier against which an object may be stopped (depending on the rate of movement of the object at that position along the conveyor as explained hereinafter). Control station 30 also includes an enlarged opening 34 through deck 16 in communication with plenum 18. Opening 34 is located immediately adjacent bar 32 on the upstream side thereof. It will be appreciated that the air jet issuing through opening 34 from plenum 18 and which jet is directed against the undersurface of an object being conveyed when the latter obtains a position adjacent bar 32, provides an increased lifting force sufficient to elevate the object above bar 32 whereby the object can be passed over bar 32 as more particularly described hereinafter. The velocity control device hereof is located along conveyor 10 at one or more stations in accordance with the distances traversed by the objects and the velocities thereby obtained.

In use, it will be appreciated that a fast-moving object conveyed along conveyor 10 by air issuing through directional slots 26 has sufficient forward momentum to penetrate completely and pass through the lifting airjet issuing through enlarged opening 34 before the airjet is fully effective to lift the object over bar 32. Bar 32 thus momentarily stops object 28 from further forward movement until the lifting jet becomes effective to elevate the object to a height above bar 32. When object 28 or at least its leading edge obtains this height, directional slots 26 in deck 16 propel object 28 in a forward direction along conveyor 10. However, since the object was at least momentarily stopped by bar 32, it will start to accelerate along conveyor 10 at a reduced velocity. The velocity of the object will increase as it is conveyed away from velocity control station 30 to either an off-loading station or to another velocity control station whereupon the velocity of the fast-moving object would again be reduced.

For slower moving objects, the airjet issuing through enlarged opening 34 creates sufficient lifting force such that the slow moving objects do not fully penetrate or pass completely through the lifting jet before it becomes effective to elevate such objects to a height greater than the height of bar 32. At such elevation, the slower moving objects pass over bar 32 without physical contact therewith. Thus the velocity of the slower moving object along conveyor 10 is not significantly affected by the interposition of the velocity control device. Also, the velocity control device discriminates between fast and slow-moving objects and retards the movement of the former without significantly affecting movement of the latter. In this manner, the accumulation rates of the conveyor are also not substantially affected by the interposition of the velocity control device.

Referring now to the embodiment hereof illustrated in FIGS. 5–7, there is disclosed an air conveyor 10a similar to air conveyor 10 with the exception that the instant embodiment includes a modified velocity control device. In this form, there is provided a pair of brackets 40 adjustably mounted along opposite sides of the conveyor deck 16a at velocity control station 30a. Each of brackets 40 includes a slot 42 angled upwardly and in a downstream direction and in which slot 42 is received the opposite ends of a bar 44. Opposite ends of bar 44 are connected to ends of coil springs 46, the opposite ends of coil springs 46 being fixed to brackets 48 secured to conveyor deck 16a. Brackets 40 and 48 are adjustably secured to conveyor deck 16a for longitudinal movement for purposes as will be described. It will be appreciated that springs 46 maintain bar 44 in the upstream ends of slots 42 and in a position elevated above deck 16a in the path of movement of objects along conveyor 10a.

The openings through conveyor deck 16a for the purpose of lifting and propelling objects along conveyor 10a are identical to the openings in conveyor 10 described previously with respect to FIGS. 1–4. In this form, however, there are provided a plurality of lift holes 50 spaced one from the other in a pair of rows extending transversely across deck 16a and straddling bar 44. That is to say, the airjets issuing through openings 50 from plenum 18a are directed upwardly on opposite sides of bar 44 when the latter lies in its retracted upstream position. As will be appreciated, openings 50 are of enlarged diameter as compared with lift holes 22a with the result that an object superposed over openings 50 is subjected to increased lifting forces in comparison with the normal lifting forces of the jets issuing through holes 22a.

In utilizing the velocity control system illustrated in FIGS. 5–7, an object 28a is conveyed along conveyor 10a similarly as previously described. If the object is a relatively fast-moving object, it has sufficient forward momentum to penetrate and pass completely through the lifting jets issuing through the upstream row of openings 50 before such airjets are fully effective to lift the object 28a over bar 44. The object 28a thus engages bar 44 and its forward movement is momentarily arrested. The forward momentum of the relatively fast moving object 28a may also be sufficient to displace the bar 44 in a downstream direction against the bias of springs 46. Displacement of bar 44 in a downstream direction permits the air jets issuing through the openings 50 on the downstream side of bar 44 to become effective against object 28a. The airjets issuing through both rows of enlarged openings 50 then become effective to elevate the object above bar 44 whereupon the air issuing from directional slots 24a acts to accelerate the object in a downstream direction at a reduced velocity. Again, it will be appreciated that the forward motion of the object is substantially arrested by its engagement with bar 44 and that, when the object is elevated to clear bar 44, it moves downstream at a relatively slower velocity than obtained upon first encountering the flow control station. Furthermore, by utilizing a spring biased bar, a cushioned or resilient stop is obtained. Moreover, since bar 44 is located at a higher position when the lifting jets issuing through the downstream row of transverse openings 50 become effective, greater control over the object as it clears bar 44 is obtained. Further, the location of velocity control device 30a can be adjusted to a limited extent longitudinally along conveyor 10a depending upon the nature of the objects being conveyed and the desired lift force at the control station.

For slower moving objects, the airjets issuing through openings 50 create sufficient lifting force such that the slow-moving objects do not fully penetrate or pass completely through the airjet before they become effective to elevate such objects to a height greater than the height of bar 44. At such elevation, the slower moving objects pass over bar 44 without physical contact therewith. Thus the velocity of a slower moving object along conveyor 10a is not significantly affected by the interposition of the velocity control device. Also, velocity control device 30a discriminates between fast and slow-moving objects and retards the movement of the former without significantly affecting movement of the latter.

Referring now to the embodiment hereof illustrated in FIGS. 8 – 9, there is disclosed an air conveyor 10b similar to the air conveyor 10 illustrated in FIGS. 1 – 4 having like lifting openings and directional slots for conveying an object along conveyor deck 16b. In this form, the velocity control device includes a plate 60 which forms a portion of air conveyor deck 16b and has directional slots 62 and lift openings 64 interspersed therein similarly as deck 16b. Plate 60 is pivoted at its downstream edge to deck 16b and carries an angled stop plate 66 over its upstream edge. Stop plate 66 extends laterally substantially coextensively with plate 60. The lower leg 68 of stop plate 66 is inclined downwardly and in a downstream direction and serves as a baffle for directing an airjet diagonally upwardly and in an upstream direction through a slot 67 defined between leg 68 and the downstream edge of deck 16b adjacent plate 60. Optimum lift characteristics are obtained by directing the airjet in this manner. A pair of brackets 69 are carried along the inside upper edges of sidewalls 12b of conveyor 10b. A setscrew 70 and a locking screw 72 are provided through plate 60 along its opposite sides adjacent its leading edge, the locking screw being threadedly engageable with plate 69 and the set screw bearing thereagainst whereby the elevation of plate 60 relative to conveyor deck 16b can be adjusted. A pair of angle brackets 74 are provided on opposite sides of plate 60 and serve to confine the airflow from plenum 18b for issuance through slot 67.

In use, plate 60 is pivoted about its downstream edge such that stop plate 66 obtains the desired elevation above deck 16b and the setscrews and locking screws are then adjusted to retain the plate in the desired elevation. This elevation also determines the size of slot 67. As in the previous embodiments, when a fast moving object approaches the elevated plate 60, its forward momentum is sufficient to carry it through the larger lifting jet issuing through slot 67. The object is accordingly momentarily stopped against stop plate 66. The lifting force provided by the large airjet issuing through slot 67 then elevates the object to a height above the upstream edge of stop plate 66. The directional slots 62 in plate 60, in conjunction with the directional slots 24b in deck 16b immediately upstream of plate 60, serve to propel the object downstream during its passage over plate 60 while the lifting openings 64 in plate 60 maintain the object in spaced relation from plate 60 similarly as it is maintained in spaced relation above deck 16b.

For slower moving objects, the airjet issuing through slot 67 creates sufficient lifting force such that the slow moving objects do not fully penetrate or pass completely through the airjet before it becomes effective to elevate such objects to a height greater than the height of stop plate 66. At such elevation, the slower moving objects passover plate 60 without physical contact therewith. Thus the velocity of a slower moving object along conveyor 10b is not significantly affected by the interposition of the velocity control device 30b. Also, velocity control device 30b discriminates between fast and slow-moving objects and retards the movement of the former without significantly affecting movement of the latter.

Referring to the embodiment hereof illustrated in FIGS. 10 and 11, there is provided an air conveyor 10c similar to the air conveyor 10 illustrated in FIGS. 1 – 4. In this form, velocity control device 30c includes a pair of upstanding guides 80 disposed on opposite sides of the conveyor 10c. The upstanding guides 80 provide slots 82 in which the opposite ends of a stop bar 84 are inserted, the bar 84 being mounted for vertical movement within guides 80. A screw 86 is threaded through the top of each of the guides 80 for the purpose of controlling the height of the rod 84 in a manner to be described. The velocity control device also includes a baffle 88 secured to the underside of deck 16c on the downstream side of an enlarged slot 90 which extends across conveyor deck 16c directly below rod 84. The leg of baffle 88 is inclined downwardly in a downstream direction and directs the airjet issuing from plenum 18c and through slot 90 in a diagonally upward upstream direction which, as noted previously, provides for optimum lifting characteristics. In this form, the force of the airjet issuing through slot 90 acts against bar 84 to lift and maintain the bar 84 in bearing engagement against the lower ends of the adjustment screws 86. That is to say, rod 84 floats within guide 80 and the elevation of rod 84 above deck 16c is controlled by threaded adjustment of screws 86.

In use, when a fast moving object reaches the velocity control station 30c, its forward momentum is sufficient to carry it through the large airjet for engagement against stop bar 84 before the large airjet becomes effective to lift the object over bar 84. Bar 84 thus momentarily arrests the forward movement of the object until the lifting jet becomes effective to elevate the object above the bar 84 whereupon the directional slots in conveyor deck 16c again serve to accelerate the object along the conveyor but at a reduced velocity.

For slower moving objects, the airjet issuing through slot 90 creates sufficient lifting force such that the slow moving objects do not fully penetrate or pass completely through the airjet before it becomes effective to elevate such objects to a height greater than the height of rod 84. At such elevation, the slower moving objects passover rod 84 without physical contact therewith. Thus the velocity of a slower moving object along conveyor 10c is not significantly affected by the interposition of velocity control device 30c.

It will be appreciated that the objects of the present invention are fully accomplished by the foregoing in that there is provided in each instance a velocity control device which discriminates between fast and slow moving objects moved along the conveyor. In each case, the fast-moving objects have sufficient momentum to penetrate and pass through the large lifting jet located at each velocity control station before the lifting jet becomes fully effective to elevate the objects to a height sufficient to clear the barrier. Thus, the barrier momentarily arrests the objects from forward movement until the lifting jet becomes effective to elevate the objects over the barrier whereupon the objects are again accelerated but at a reduced velocity. The forward momentum of slow-moving objects, however, is not sufficient to permit the object to fully penetrate through the large airjet before the jet becomes effective to lift the object to a height sufficient to clear the barrier. The rate of forward movement of the slow-moving objects is thus not significantly affected or retarded by the interposition of the velocity control device. The velocity control device in each instance discriminates between fast and slow-moving objects on the air conveyor and thus does not affect accumulation recovery rates.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A conveyor for moving objects in a generally horizontal direction by utilizing airjets comprising; an elongated, substantially horizontally disposed, conveyor deck having a plurality of openings therethrough for transmitting air from the lower to the upper side thereof, said openings being arranged such that the airjets issuing therethrough are adapted to convey objects along a predetermined path contiguous to and spaced above said deck, means for arresting the movement of the objects along said path including a barrier disposed in the path of movement of the objects, and means for enabling the objects to move past said arresting means to continue their movement along said predetermined path including means arranged to direct air against the objects to elevate the latter to a height above said barrier.

2. A conveyor according to claim 1 wherein said openings comprise lift holes and directional slots configured such that the airjets issuing therethrough have respective predominantly vertical flow components for elevating objects above said deck and predominantly horizontal flow components for propelling the objects along said predetermined path.

3. A conveyor according to claim 2 wherein said directing means includes an opening in said deck adjacent said arresting means, the vertical flow component of the airjet issuing through said latter opening being greater than the vertical flow component of the airjets issuing through the lift holes at locations along said deck other than the location therealong of said arresting means.

4. A conveyor according to claim 1 including means for adjusting the height of said barrier above said deck.

5. A conveyor according to claim 1 wherein said barrier comprises an element movable longitudinally between first and second positions, means for biasing said element into said first position including a spring, said element being movable from said first position to said second position against the bias of said spring when the objects engage said element.

6. A conveyor according to claim 5 wherein element is a rod extending across said deck, means for mounting said rod including brackets on opposite sides of said deck, said brackets having slots inclined upwardly and forwardly in the direction of conveyance, the opposite ends of said rod being received within said slots, said spring being adapted to bias said rod into a lowermost position in said slots whereby said rod is movable upwardly and forwardly against the bias of said spring in response to the engagement of the objects against said rod.

7. A conveyor according to claim 1 wherein said barrier comprises a plate having at least a portion thereof elevated above said deck and in the path of movement of the objects, said plate having a plurality of openings therethrough for transmitting air from the lower to the upper side thereof, said openings being arranged such that the airjets issuing therethrough are adapted to convey objects therealong and in spaced relation thereto.

8. A conveyor according to claim 7 wherein said plate is pivotally carried by said conveyor, the elevated portion of said plate comprising an edge of said plate, the area between said plate edge and said conveyor deck forming a slot for directing air against the objects and elevating the latter to a height above said plate edge.

9. A conveyor according to claim 8 including means for adjusting the height of said plate edge above said conveyor deck.

10. A conveyor according to claim 1 wherein said barrier includes an element extending across said deck, guide means mounting said element for free vertical movement, stop means above said deck for limiting the elevation of said element above said deck and locating said element in the predetermined path of movement of the objects, said directing means being arranged to direct air against said element to lift said element and maintain it in a fixed floating position bearing against said stop means.

11. A conveyor according to claim 10 including means for adjusting the height of said stop means above said deck.

12. A conveyor according to claim 10 wherein said directing means includes an opening in said deck underlying said element, and a baffle for directing air against the underside of the objects as they obtain positions adjacent said element on the upstream side thereof.

13. An air conveyor for moving objects in a generally horizontal direction by airjets comprising: an elongated, substantially horizontally disposed, conveyor deck having a plurality of openings therethrough for transmitting air from the lower to the upper side thereof, said openings being arranged such that the air issuing therethrough is adapted to convey an object along a predetermined path contiguous to and spaced above said deck, means disposed at a predetermined location along the conveyor for arresting the movement of the object along said path, means for enabling the object to move past said arresting means and to continue its movement along said predetermined path including an airjet adapted to direct air against the object to displace it from said predetermined path and thereby avoid said arresting means.

14. An air conveyor according to claim 13 including means coextensive with and underlying said deck defining a fan, said deck forming an upper wall portion of said plenum, and a blower disposed at one end of said plenum for supplying air under pressure to said plenum for flow through the openings in said deck.

* * * * *